G. N. ALBREE.
FITTING FOR AIRPLANES AND THE LIKE.
APPLICATION FILED NOV. 28, 1917.

1,315,694.

Patented Sept. 9, 1919.
2 SHEETS—SHEET 1.

Inventor:
George Norman Albree,
by Roberts Roberts & Cushman
His Attorneys.

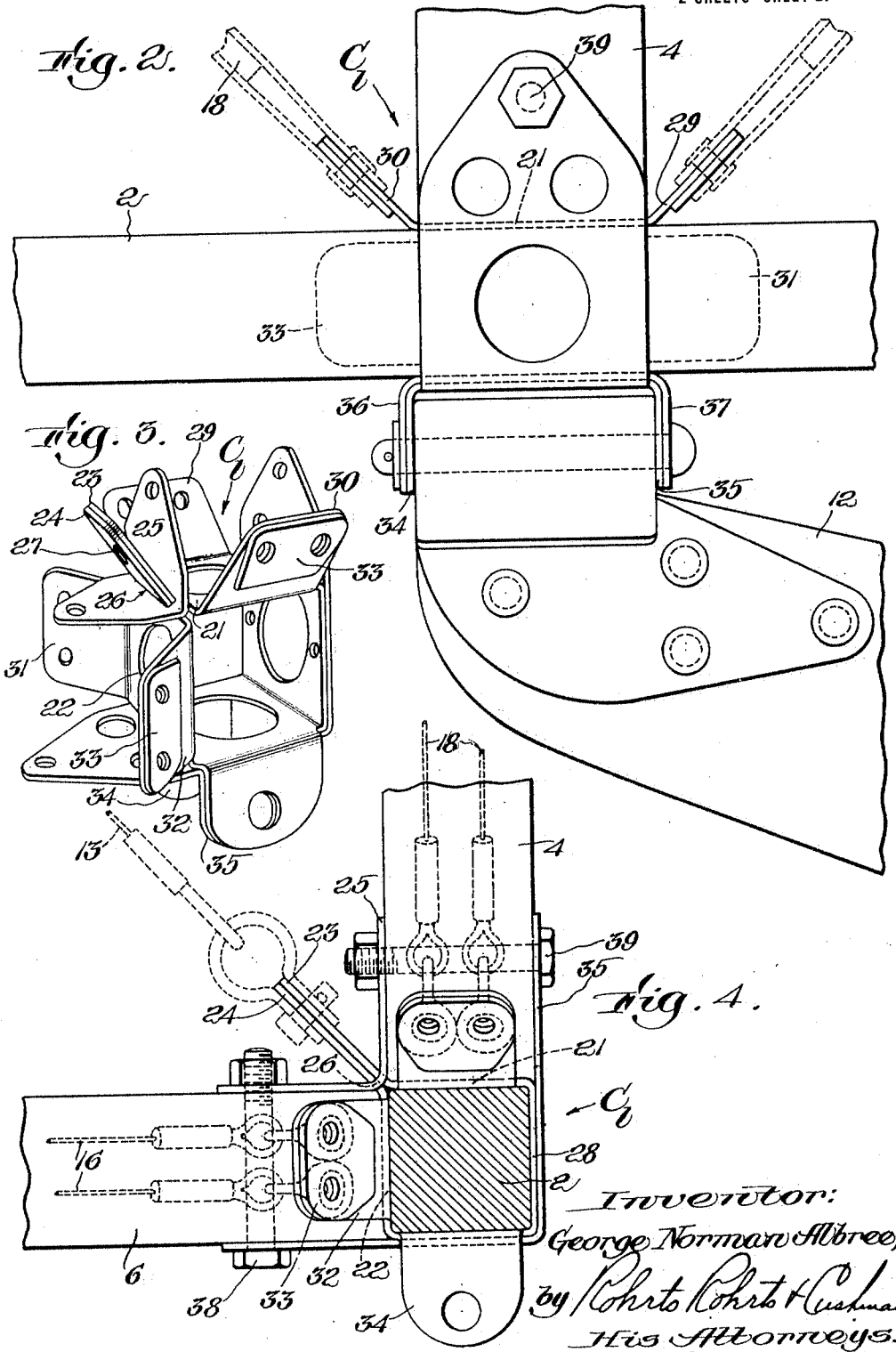

UNITED STATES PATENT OFFICE.

GEORGE NORMAN ALBREE, OF SWAMPSCOTT, MASSACHUSETTS.

FITTING FOR AIRPLANES AND THE LIKE.

1,315,694.     Specification of Letters Patent.     Patented Sept. 9, 1919.

Application filed November 28, 1917. Serial No. 204,465.

*To all whom it may concern:*

Be it known that I, GEORGE NORMAN ALBREE, citizen of the United States of America, and resident of Swampscott, in the county of Essex and State of Massachusetts, have invented new and useful Improvements in Fittings for Airplanes and the like, of which the following is a specification.

This invention relates to fittings for frame-work and more particularly to fittings for connecting the frame members of airplanes and the like having two or more members meeting at a common point and having wires or other bracing members radiating from the common point.

The principal objects of the invention are to provide fittings which possess both strength and lightness, which are simple to construct and easy to apply, which have means for simply and rigidly locking the parts in position, which have means for pivotally attaching parts thereto, which are readily adaptable to different positions and conditions of usage, and which possess other novel features of utility which will be apparent from the following description and the accompanying drawings, in which,—

Fig. 2 is a side elevation of the fitting shown at the lower right-hand corner of Fig. 1;

Fig. 3 is a perspective view of the same fitting; and

Fig. 4 is an enlarged sectional view of the fitting corresponding to Fig. 1.

Figure 1:
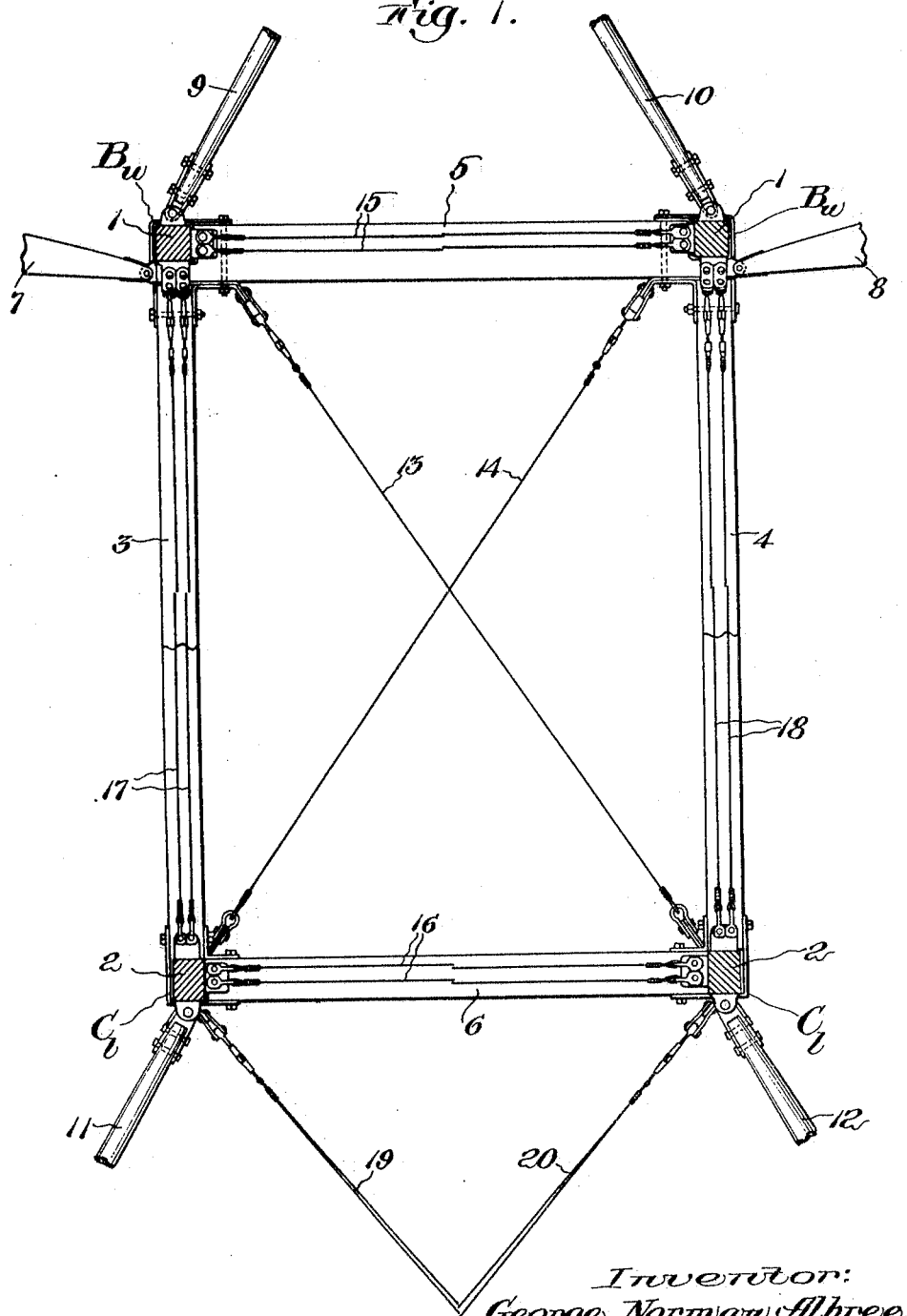
Figure 1 is a transverse sectional view of an airplane fuselage showing one application of the present invention.

The airplane frame-work in Fig. 1, to which the invention is applied for the purpose of illustration, comprises upper and lower longitudinals 1 and 2, vertical strut members 3 and 4, horizontal strut members 5 and 6, main wings 7 and 8, king posts 9 and 10 to the upper ends of which wing supporting wires are intended to be secured, and members 11 and 12 extending downwardly to wheels or other landing-gear (not shown). At the points where the vertical strut 3 and 4 and the horizontal strut 5 meet the upper longitudinals 1, fittings $B_u$ are provided to secure the parts together and for other purposes hereinafter set forth. At the points where the vertical struts 3 and 4 and the horizontal strut 6 meet the lower longitudinals 2, fittings $C_1$ are provided, these fittings being similar both in structure and function to the fittings $B_u$ but being somewhat different. The fittings $C_1$ comprise the preferred embodiment of the present invention and the fittings $B_u$ comprise the preferred embodiment of an invention forming the subject-matter of a patent applied for on even date herewith.

It is to be understood that vertical and horizontal struts, such as shown at 3, 4, 5 and 6, are provided at intervals throughout the length of the fuselage, so that either a side or a plan view of the fuselage would present a series of rectangles formed by the struts and longitudinals, each rectangle being similar to that formed in Fig. 1 by struts 3, 4, 5 and 6. In order to brace the frame-work guys or stays are diagonally extended across the transverse rectangles between the opposed junctions of the struts, two such guys being shown at 13 and 14 in the drawings, and for the same purpose guys are diagonally extended across the top, bottom and side rectangles, portions of such guys being shown at 15, 16, 17 and 18. These guys may be employed singly as at 13 and 14 or multiply as at 15, 16, 17 and 18. Similar guys may be employed in the landing-gear as indicated at 19 and 20.

One of the cardinal features of my improved fitting involves novel means for connecting the struts and guys to the longitudinals. In the broader aspect of the invention this means comprises two plates 21 and 22, having lips 23 and 24 extending inwardly therefrom in juxtaposition, and a clip which is preferably in the form of a strap 25 extending along each of the struts 4 and 6 in the angle between the struts and having a slot 26 fitting over the lips 23 and 24. The lips 23 and 24 have registering openings 27 near the outer ends thereof for connecting a guy such as 13 thereto. The guy exerts a strong pull upon the lips and in the absence of the clip the lips would pull apart. However, the clip tightly locks the lips together and when secured to the struts in the manner hereinafter set forth also functions rigidly to tie the struts and longitudinals together as will now be described.

The plates 21 and 22 are secured to the longitudinal 2 and in my preferred construction this is effected by connecting the plates together by a connecting strip 28 so that the plates 21 and 22, the lips 23 and 24, and the connecting strip 28 form a continuous strap the central portion of which surrounds the longitudinal. When the longitudinal is rectangular the central portion of the strap is bent into rectangular form, as illustrated, but if the longitudinal be round, hexagonal or of other cross-sectional contour the strap will preferably be made to conform substantially to the particular contour employed.

For the purpose of connecting to the fitting the guys or stays which extend across the rectangular openings in the side of the fuselage, I provide perforate lips 29 and 30 on the sides of plate 21, the lips being bent upwardly at an oblique angle to the plate 21 into the plane of the respective guys connecting with the lips (Fig. 2). Perforate lips 31 and 32 are similarly provided on the plate 22 for attaching the bottom guys 16. If desired reinforcing plates 33 may be provided on the lips 29 to 32 as illustrated.

My improved clip is adapted to connect with parts other than the struts and guys of a frame-work and as illustrating this adaptability I have illustrated the members 11 and 12 of the landing gear as being pivotally connected to lips 34 and 35 formed integrally with the strap 28 and depending therefrom. The wings 7 and 8 and king posts 9 and 10 are similarly connected to the upper fittings $B_u$.

In order further to strengthen my improved fitting I preferably also provide a strap 35 along the struts opposite to the strap 25. This strap is preferably spot-welded to the strap 28 and is preferably provided with depending lips 36 and 37 to coöperate with lips 34 and 35. Bolts 38 and 39 tightly clamp the straps 25 and 35 to the respective struts.

The principal characteristics of my improved fitting may be employed in various ways, and I therefore do not desire to be limited to the specific embodiment herein described. For example, certain features of the present invention are embodied in the fitting $B_u$ shown at the top of Fig. 1, but inasmuch as this fitting forms the subject-matter of a patent applied for on even date herewith it need not be described in detail herein.

I claim:

1. A fitting for the frames of airplanes and the like comprising two plates having lips extending obliquely therefrom so as to lie in juxtaposition when the said plates are disposed on adjacent sides of a frame member, and means surrounding the bases of said lips for holding the lips together to prevent them from spreading apart when subjected to an outward force.

2. A fitting for the frames of airplanes and the like comprising two plates having lips extending therefrom, the lips being arranged to lie in juxtaposition when the said plates are disposed on adjacent sides of a frame member, and a slotted clip fitting over said lips.

3. A fitting for the frames of airplanes and the like comprising two plates having lips extending obliquely therefrom so as to lie in juxtaposition when the said plates are disposed on adjacent sides of a frame member, and a slotted plate fitting over said lips in proximity to said two plates.

4. A fitting for the frames of airplanes and the like comprising a strap bent to surround a frame member with the ends thereof extending outwardly in juxtaposition, and means continuously engaging the said ends throughout substantially their entire width for holding the ends together to prevent them from spreading apart when subjected to an outward force.

5. A fitting for the frames of airplanes and the like comprising a strap bent to surround a frame member with the ends thereof extending outwardly in juxtaposition, and a clip fitting over said ends to tie the ends together.

6. A fitting for the frames of airplanes and the like comprising a strap bent to surround a frame member with the ends thereof extending outwardly in juxtaposition, and a slotted plate fitting over said ends at the base thereof.

7. A fitting for the frames of airplanes and the like comprising a strap bent to surround a frame member with the ends thereof extending outwardly in parallel contact with each other and obliquely to the adjacent portions of the strap, and a clip fitting over said ends in juxtaposition to said frame member for preventing the ends from spreading apart when subjected to an outward force.

8. A fitting for connecting a main member with members extending laterally therefrom comprising plates disposed between the main member and the respective lateral members, lips on the plates extending in juxtaposition into the angle between said lateral members, and means adapted to be secured to said lateral members for holding said lips together.

9. A fitting for connecting a main member with members extending laterally therefrom comprising plates disposed between the main member and the respective lateral members, lips on the plates extending in juxtaposition into the angle between said lateral members, a clip adapted to be secured to each of said lateral members, the clip having a slot to receive said lips.

10. A fitting for connecting a main member with members extending laterally therefrom comprising a strap surrounding the main member under the lateral members with the ends thereof extending in juxtaposition into the angle between the lateral members, and a clip disposed along the lateral members in said angle, the clip having a slot therein to receive said ends.

11. A fitting for connecting a main member with members extending laterally therefrom comprising a strap surrounding the main member under the lateral members with the ends thereof extending in juxtaposition into one of the angles between the lateral members, a slotted clip fitting over said ends and being secured to each of the lateral members, and a second strap secured to each of said lateral members and to said first strap in the other of said angles.

12. A fitting for connecting a main member with members extending laterally therefrom comprising plates disposed between the main member and the respective lateral members, lips on the plates extending in juxtaposition into one of the angles between said lateral members, a clip plate mounted along both lateral members in said angle, the clip plate having a slot to receive said lips, and a tie plate mounted along both lateral members in the other of the angles between said lateral members, the tie plate being secured to each of said first plates.

13. A fitting for connecting a main member with members extending laterally therefrom comprising a strap extending around the main member under the lateral members, a second strap mounted along the lateral members and being secured to the first strap, the two straps having tabs extending away from the main member in juxtaposition for attaching the fitting to another lateral member.

Signed by me at Hampton, Virginia, this twenty-second day of November, 1917.

GEO. NORMAN ALBREE.

Copies of this patent may be obtained for five cents each, by addressing the "Commissioner of Patents, Washington, D. C."